United States Patent
Maria et al.

(10) Patent No.: US 11,427,501 B2
(45) Date of Patent: *Aug. 30, 2022

(54) GLASS SHEET COATED WITH A STACK OF THIN LAYERS AND AN WITH AN ENAMEL LAYER

(71) Applicant: SAINT-GOBAIN GLASS FRANCE, Courbevoie (FR)

(72) Inventors: Juliette Maria, Compiegne (FR); Yann Cohin, Paris (FR); Arnaud Huignard, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/254,678

(22) PCT Filed: Jun. 21, 2019

(86) PCT No.: PCT/FR2019/051527
§ 371 (c)(1),
(2) Date: Dec. 21, 2020

(87) PCT Pub. No.: WO2019/243755
PCT Pub. Date: Dec. 26, 2019

(65) Prior Publication Data
US 2021/0155537 A1    May 27, 2021

(30) Foreign Application Priority Data
Jun. 22, 2018 (FR) ........................................ 1855568

(51) Int. Cl.
*B32B 15/04* (2006.01)
*C03C 17/36* (2006.01)
*C03C 8/04* (2006.01)

(52) U.S. Cl.
CPC ............ *C03C 17/3686* (2013.01); *C03C 8/04* (2013.01); *C03C 17/3626* (2013.01); *C03C 17/3644* (2013.01); *C03C 17/3681* (2013.01); *C03C 2207/02* (2013.01); *C03C 2217/213* (2013.01); *C03C 2217/228* (2013.01); *C03C 2217/256* (2013.01); *C03C 2217/28* (2013.01); *C03C 2217/281* (2013.01); *C03C 2218/113* (2013.01); *C03C 2218/156* (2013.01)

(58) Field of Classification Search
CPC ..................... C03C 17/3686; C03C 2217/213
USPC ......................................... 428/426, 428, 432
See application file for complete search history.

(56) References Cited

U.S. PATENT DOCUMENTS 11,192,821 B2 * 12/2021 Jamart ................ C03C 17/3681

FOREIGN PATENT DOCUMENTS

| WO | WO 96/41773 A1 | 12/1996 |
| WO | WO 01/21540 A1 | 3/2001 |
| WO | WO 2007/028913 A1 | 3/2007 |
| WO | WO 2015/145073 A1 | 10/2015 |
| WO | WO 2019/106264 A1 | 6/2019 |
| WO | WO2019106264 * | 6/2019 |

OTHER PUBLICATIONS

International Search Report as issued in International Patent Application No. PCT/FR2019/051527, dated Oct. 2, 2019.

* cited by examiner

*Primary Examiner* — Lauren R Colgan
(74) *Attorney, Agent, or Firm* — Pillsbury Winthrop Shaw Pittman LLP

(57) ABSTRACT

A material includes a glass sheet coated on at least part of one of its faces with a stack of thin layers, the stack being coated on at least part of its surface with an enamel layer including zinc and less than 5% by weight of bismuth oxide, the stack further including, in contact with the enamel layer, a layer, called contact layer, which is based on an oxide, the physical thickness of the contact layer being at least 5 nm.

21 Claims, No Drawings

GLASS SHEET COATED WITH A STACK OF THIN LAYERS AND AN WITH AN ENAMEL LAYER

CROSS-REFERENCE TO RELATED APPLICATIONS

This application is the U.S. National Stage of PCT/FR2019/051527, filed Jun. 21, 2019, which in turn claims priority to French patent application number 1855568 filed Jun. 22, 2018. The content of these applications are incorporated herein by reference in the entireties.

The invention relates to the field of materials comprising a glass sheet coated with a stack of thin layers. Such materials are intended to form or to be incorporated in building glazing or in parts of household appliances, such as oven doors.

Stacks of thin layers give various properties to the materials, for example optical properties (reflective or, conversely, antireflective layers), energetic properties (solar control and/or low emissivity layers) or electrical conduction properties (used for example for heated glazing).

Glass sheets are sometimes coated, on at least part of their surface, with a layer of enamel. An enamel is a mineral material formed from a composition comprising at least one pigment and at least one glass frit. A glass frit consists of fine particles of a low-melting-point glass which, under the effect of a firing heat treatment, softens and adheres to the glass sheet. A mineral layer is thus formed, generally opaque, with high chemical and mechanical resistance, adhering perfectly to the glass while maintaining the pigment particles. Enamel layers can have a decorative or aesthetic function, but also a protective function.

Enamel layers can for example be deposited on the periphery of glass sheets used in oven doors to camouflage certain areas of the oven. Low-emissivity stacks are sometimes placed beneath the enamel layer in order to reduce heat exchange with the outside of the oven. In the building industry, glazings called "spandrel glass" are used for building facades, in which the entire glass sheet is covered with a colored and decorative enamel layer. Solar control stacks are sometimes placed beneath the enamel layer to limit the heating of the building by solar radiation. Enamel layers can also be used to create a certain design, by depositing the enamel in any pattern, for example in facade, partition wall, shower wall applications, etc.

The inventors were able to demonstrate that in the case of the use of enamels containing zinc and less than 5% by weight of bismuth oxide deposited on stacks of thin layers, the visual appearance of the enamel could depend strongly on the firing temperature. Typically, whether in the case of enameling bare glass or glass coated with a stack of thin layers, there is a minimum firing temperature required to achieve a good firing of the enamel and a good reflective visual appearance. For bare glass, the range of possible firing temperatures is wide, in the sense that an increase of the firing temperature by 50 or 100° C. above this minimum firing temperature does not substantially change the reflective appearance of the enamel. In contrast, in the case of glass coated with a stack of thin layers, a sometimes minimal increase in the firing temperature relative to the minimum firing temperature may lead to a change in the reflective appearance. The range of possible firing temperatures, called $\Delta T$, is then reduced. For example, it has been observed that for stacks in which the last layer (or one of the last layers) was based on silicon nitride, the $\Delta T$ range could be as low as 5 or 10° C.

Low $\Delta T$ ranges are detrimental from the point of view of industrial production because obtaining products of homogeneous color requires the use of firing equipment capable of heating the glass sheet in a very homogeneous manner. Even in the case of high-performance equipment, the edges of the glass sheet often experience slightly higher temperatures than the center, which can lead to color heterogeneity. Finally, in the case of stacks of layers with low emissivity, the enamel-free areas are essentially heated by convection whereas the areas covered with enamel are heated by convection and radiation. Areas close to the enamel-free areas consequently experience lower temperatures than the others. It is therefore very difficult in the case of low $\Delta T$ ranges to obtain industrially glass sheets that are perfectly homogeneous in terms of visual appearance.

The purpose of the invention is to solve these problems by offering stacks for which the $\Delta T$ range is high, thus reducing industrial production costs.

To this end, the invention has as its object a material comprising a glass sheet coated on at least part of one of its faces with a stack of thin layers, said stack being coated on at least part of its surface with an enamel layer comprising zinc and less than 5% by weight of bismuth oxide, said stack further comprising, in contact with the enamel layer, a layer, called contact layer, which is based on an oxide, the physical thickness of said contact layer being at least 5 nm.

The invention also has as its object a process for manufacturing a material according to the invention, comprising the deposition of a stack of thin layers on at least part of one face of a glass sheet, then the deposition on at least part of the surface of said stack of a layer of enamel comprising zinc and less than 5% by weight of bismuth oxide.

The material according to the invention has, in a superimposed manner, a stack of thin layers then a layer of enamel, the latter not being in contact with the glass sheet. The presence of a contact layer increases the $\Delta T$ range and thus the visual homogeneity of the material.

The glass sheet is preferably flat, in particular when the material is intended for building glazing or for oven doors, but it can also be bent. In the latter case the glass sheet is generally flat when the stack of thin layers then the enamel layer are deposited, and can then be bent. The glass is typically a soda-lime-silica glass, but other glasses, for example borosilicates or aluminosilicates, can also be used. The glass sheet is preferably obtained by floating, i.e. a process in which molten glass is poured over a molten tin bath. The glass sheet can be mechanically strengthened, in particular hardened or thermally toughened. To do this, the glass sheet is heated to a temperature of about 600° C. or above, a treatment that can if desired lead to bending of the glass, and then cooled rapidly to create compressive stresses on its surface. Firing of the enamel preferably takes place during this heat treatment. The glass sheet can be clear or tinted, for example in green, blue, gray or bronze. The glass sheet preferably has a thickness comprised in the range from 0.7 to 19 mm, in particular 1 to 10 mm, particularly 2 to 6 mm, and even 2 to 4 mm.

The glass sheet is preferably coated with a stack of thin layers on at least 70%, in particular 80%, or even the entire surface of the first face. Depending on the applications, the stack can be coated with the enamel layer on at least 80%, or even 90% of its surface (in the case of spandrel glass), or on at most 40%, in particular 30% and even 20%, or even 15% of its surface, often on the periphery of the glass sheet (in the case of oven doors, or glazing incorporating a Marie-Louise). In the case of enameled patterns intended to confer a certain design, this figure is typically comprised between 5 and 80%.

In the present text, "contact" means physical contact. The expression "based on" preferably means the fact that the layer in question comprises at least 50% by weight of the material in question, in particular 60%, or even 70% and even 80% or 90%. The layer may even essentially consist or consist of this material. "Essentially consist" should be understood to mean that the layer may contain impurities without influence on its properties. The terms "oxide" or "nitride" do not necessarily mean that the oxides or nitrides are stoichiometric. They can indeed be sub-stoichiometric, over-stoichiometric or stoichiometric.

Preferably, the contact layer comprises an oxide of at least one element selected from aluminum, silicon, titanium, zinc, zirconium, tin. The contact layer may comprise an oxide of at least two or three of these elements, for example an oxide of zinc and tin, or an oxide of silicon and aluminum.

The contact layer is advantageously a layer based on silicon oxide, more particularly a layer consisting essentially of a silicon oxide. When the silicon oxide layer is deposited by sputtering it generally contains aluminum, as it is common practice to dope silicon targets with aluminum to accelerate deposition rates.

The contact layer is preferably obtained by sputtering or by a sol-gel process. More details on these processes are given hereinbelow.

The contact layer preferably has a physical thickness of at least 10 nm, in particular 20 nm, 30 nm, 40 nm, or even 50 nm and even 80 or 100 nm, or 150 or 200 nm. This thickness is preferably at most 2 µm, in particular 1 µm, or even 500 nm and even 100 nm. Increasing the thickness of the contact layer is favorable for obtaining high $\Delta T$ ranges.

The stack preferably comprises at least one layer based on a nitride.

The at least one nitride-based layer preferably comprises a nitride of at least one element selected from aluminum, silicon, zirconium, titanium. It may comprise a nitride of at least two or three of these elements, for example a nitride of silicon and zirconium, or a nitride of silicon and aluminum. Preferably, the nitride-based layer is a silicon nitride-based layer, more particularly a layer consisting essentially of silicon nitride. When the silicon nitride layer is deposited by sputtering it generally contains aluminum, as it is common practice to dope silicon targets with aluminum to accelerate deposition rates.

The at least one nitride-based layer preferably has a physical thickness comprised in the range from 2 to 100 nm, in particular from 5 to 80 nm, or even from 20 to 50 nm.

Nitride-based layers are commonly used in many stacks of thin layers because they have advantageous blocking properties, in the sense that they prevent oxidation of other layers present in the stack, in particular functional layers which will be described below. The inventors were however able to demonstrate that the presence of these layers, in particular near the enamel layer, was detrimental to obtaining high $\Delta T$ ranges. The invention is therefore particularly useful for stacks containing this type of layers.

Preferably, at least one nitride-based layer is in contact with the contact layer, or at a distance of less than 5 nm from the contact layer. The advantages of the invention are even more obvious for these stacks.

The stack preferably comprises at least one functional layer, in particular an electrically conductive, solar control, or low-emissivity functional layer. The functional layer is preferably comprised between two dielectric thin layers, at least one of which is a nitride-based layer. Other possible dielectric layers are for example oxide or oxynitride layers.

At least one functional layer is advantageously selected from:
 metallic layers, in particular silver or niobium,
 layers of a transparent conductive oxide, in particular selected from indium-tin oxide, doped tin oxides (for example with fluorine or antimony) and doped zinc oxides (for example with aluminum or gallium), and
 niobium nitride-based layers.

These layers are particularly valued for their low emissivity or their ability to filter solar radiation, which gives the glazing excellent thermal insulation properties. In hot weather, low-emissivity glazing reflects part of the solar radiation towards the outside and thus limits the heating of the inside of homes and, if applicable, reduces air-conditioning costs. Conversely, in cold weather, these glazings retain heat within the home and therefore reduce the energy effort for heating. In the case of oven doors, the low-emissivity layers reduce heat emissions outside the oven, thus increasing the latter's efficiency while limiting the risk of burns for users.

According to an embodiment of the invention, the stack of thin layers preferably comprises at least one layer of indium-tin oxide. Its physical thickness is preferably comprised between 30 and 200 nm, in particular between 40 and 150 nm. This layer is advantageously comprised between two layers based on nitride, in particular silicon nitride. The contact layer is preferably based on silicon oxide.

According to another embodiment of the invention, the stack of thin layers comprises at least one layer of silver, in particular one, two or three layers of silver. The total physical thickness of silver is preferably comprised between 3 and 30 nm, in particular between 5 and 20 nm. The or each silver layer is preferably surrounded by dielectric layers, some of which are based on nitride, in particular silicon nitride.

According to another embodiment of the invention, the stack of thin layers comprises a layer of niobium or of niobium nitride. The functional layer is preferably surrounded by dielectric layers, some of which are based on nitride, in particular silicon nitride.

Alternatively, the stack may not comprise a functional layer. The stack may thus, for example, comprise a succession of thin layers, none of which, individually, confers a particular function, but which together produce optical effects, in particular through multiple interferences. They may for example be antireflective stacks or, conversely, reflective stacks.

At least part of the stack of thin layers can be deposited by various known techniques, for example by chemical vapor deposition (CVD), or by sputtering, in particular assisted by a magnetic field (magnetron process).

According to an embodiment, the entire stack of thin layers (including the contact layer) is deposited by sputtering, in particular assisted by a magnetic field. In this process, a plasma is created under a high vacuum in the vicinity of a target comprising the chemical elements to be deposited. The active species of the plasma, by bombarding the target, tear off said elements, which are deposited on the glass sheet to form the desired thin layer. This process is called "reactive" when the layer consists of a material resulting from a chemical reaction between the elements torn from the target and the gas contained in the plasma. The major advantage of this process lies in the possibility of depositing on the same line a very complex stack of layers by successively running the glass sheet under different targets, generally in one and the same device.

According to another embodiment, the entire stack of thin layers, excluding the contact layer, is deposited by sputtering, in particular assisted by a magnetic field. In this case, the contact layer is preferably deposited by the sol-gel process. In the latter process, a sol containing precursors of the layer to be produced is deposited on the glass sheet by various means, such as sputtering, curtain, laminar coating, roller, screen printing, etc. The sol preferably contains organometallic precursors of the layer to be produced, for example tetraethyl orthosilicate (TEOS).

The layer is then dried and annealed to densify it. This process makes it possible to obtain thicker contact layers than with the sputtering process. The physical thickness of the contact layer can thus be at least 100 nm, in particular 200 nm and even 500 nm, or even 1 μm and more.

The enamel layer is preferably formed from a composition comprising at least one pigment and at least one zinc borosilicate glass frit. The enamel layer preferably does not comprise lead oxide. The weight content of bismuth oxide in the enamel layer is advantageously at most 4%, in particular 3%, or even 2%, and even 1%. It is preferably zero.

The enamel composition generally further comprises an organic medium, intended to facilitate the application of the composition to the substrate and its temporary adhesion to the latter, and which is removed when the enamel is fired. The medium typically comprises solvents, thinners, oils and/or resins. In the present text, "enamel composition" is used to describe the liquid composition used to deposit a wet enamel layer on the glass sheet. The term "enamel layer" is used to describe the final layer, after firing, while the term "wet enamel layer" is used to describe the enamel layer before firing.

The enamel layer is preferably applied by screen printing. To do this, a screen-printing screen, which comprises meshes, some of which are closed, is placed on the glass sheet and then the enamel composition is deposited on the screen, then a doctor blade is applied to force the enamel composition through the screen in the areas where the screen meshes are not closed, so as to form a wet enamel layer.

The deposition of the enamel layer comprises a firing step, preferably at a temperature of at least 600 and even 650° C., and at most 700° C., preferably during a bending and/or tempering treatment of the glass sheet.

The pigments preferably comprise one or more oxides selected from chromium, copper, iron, manganese, cobalt, nickel oxides. They can be, by way of example, copper and/or iron chromates.

Preferably the enamel layer is opaque, black or gray in color. Any other color is however possible: white, red, blue, green, yellow, etc. The enamel layer may cover the entire surface of the glass sheet, or it may be placed on the periphery of the glass sheet.

The invention also has as its object a glazing, in particular a spandrel glass, or a door of an electrical household appliance comprising at least one material as described above.

The glazing is preferably a building glazing. It can in particular be a spandrel glass, part of a facade, a partition, a shower wall, comprising a stack of thin layers conferring low-emissivity and/or solar control properties or special optical effects. The enamel may cover the entire glazing (in the case of spandrel glass) or only part, either to conceal and/or to protect elements located behind the glazing, or to create a design.

The material according to the invention can be laminated to another glass sheet by means of a laminating interlayer, in particular of polyvinylbutyral (PVB). The stack of thin layers is then preferably on the side of the interlayer. In this case, the use of a silica-based contact layer is particularly advantageous because silica has the same refractive index as PVB, so it has no impact on the optics of the final material.

The appliance door is preferably an oven door or a refrigerator door (positive or negative cold).

The oven door preferably has at least one outer glass, close to the user, and one inner glass, close to the interior of the oven. In this case, the material according to the invention may be an inner glass, in particular coated with a low-emissivity stack, or an outer glass, in particular coated with a stack conferring optical effects, for example a reflective stack.

The refrigerator door may in particular be a single or a multiple glazing, in particular a double glazing. The material according to the invention, integrated in this door, is preferably coated with a low-emissivity stack.

The following examples of embodiments illustrate the invention in a non-limiting manner.

COMPARATIVE EXAMPLE 1

In this comparative example, a sheet of clear soda-lime glass was coated by screen printing with a layer of black enamel. The enamel, based on zinc borosilicate, comprises (by weight) 8% $B_2O_3$, 32% $SiO_2$, 17% ZnO, 4% $TiO_2$, 2% $Al_2O_3$, 22% $Cr_2O_3$ and 12% CuO. The enamel composition is free of bismuth oxide.

The ΔT range was then evaluated as follows. A sample is placed in a gradient furnace so as to fire the enamel at a different temperature depending on the area of the sample. A measure of brightness L* in non-specular reflection as a function of the area is used to evaluate the amplitude of the ΔT range.

The ΔT range is greater than 50° C. An L* value of less than 5 (characteristic of a black color) is obtained.

COMPARATIVE EXAMPLE 2

Comparative example 2 differs from the previous in that the clear soda-lime glass sheet was first coated by magnetron sputtering with a low-emissivity stack of thin layers consisting, starting from the glass, of the following layers: $SiN_x$ (40 nm)/NiCr (1 nm)/Ag (7 nm)/NiCr (0.5 nm)/$SiN_x$ (40 nm)/$TiZrO_x$ (3 nm).

The enamel layer was therefore deposited in contact with this stack of thin layers.

In this case the ΔT range was only 5° C. L* values of 7 were obtained, characteristic of a shallower black than in the case of comparative example 1.

EXAMPLE 1

Example 1 differs from comparative example 2 in that a silica contact layer deposited by a sol-gel process was deposited on the stack of thin layers. The contact layer was deposited by screen printing and its thickness was 100 nm.

The ΔT range was at least 15° C. L* values of 5 were obtained.

EXAMPLE 2

Unlike example 1, the silica contact layer was deposited by magnetron sputtering of an aluminum-doped silicon target in a reactive plasma containing argon and oxygen. The thickness of the contact layer was 30 nm.

The ΔT range was at least 20° C. L* values of 5 were obtained.

Similar results were obtained with contact layer thicknesses of 50 and 70 nm.

EXAMPLE 3

In this example, the clear soda-lime glass sheet was first coated by magnetron sputtering with a solar-control stack of thin layers consisting, starting from the glass, of the following layers: $SiN_x$ (10 nm)/Nb (30 nm)/$SiN_x$ (30 nm).

The silica contact layer was deposited by magnetron sputtering of an aluminum-doped silicon target in a reactive plasma containing argon and oxygen. The thickness of the contact layer was according to the tests 10 or 30 nm.

The ΔT range was at least 20° C. in all cases. L* values of 5 were obtained.

The use of a contact layer thus made it possible to increase the range of usable firing temperatures and achieve deeper black colors.

The invention claimed is:

1. A material comprising a glass sheet coated on at least part of one of its faces with a stack of layers, said stack being coated on at least part of its surface with an enamel layer comprising zinc and less than 5% by weight of bismuth oxide, said stack further comprising, in contact with the enamel layer, a contact layer, which is made of an oxide, the physical thickness of said contact layer being at least 5 nm.

2. The material as claimed in claim 1, wherein the oxide is an oxide of at least one element selected from the group consisting of aluminum, silicon, titanium, zinc, zirconium, and tin.

3. The material as claimed in claim 2, wherein the contact layer comprises a silicon oxide-based layer.

4. The material as claimed in claim 1, wherein the contact layer is obtained by sputtering or by a sol-gel process.

5. The material as claimed in claim 1, wherein the stack of layers comprises at least one nitride layer.

6. The material as claimed in claim 5, wherein at least one nitride layer is in contact with the contact layer or at a distance of less than 5 nm from the contact layer.

7. The material as claimed in claim 5, wherein the nitride is a nitride of at least one element selected from the group consisting of aluminum, silicon, zirconium, and titanium.

8. The material as claimed in claim 1, wherein the contact layer has a physical thickness of at least 10 nm.

9. The material as claimed in claim 8, wherein the contact layer has a physical thickness of at least 20 nm.

10. The material as claimed in claim 1, wherein the stack comprises at least one functional layer.

11. The material as claimed in claim 10, wherein the at least one functional layer is selected from the group consisting of a metallic layer, a layer of a transparent conductive oxide, and a niobium nitride layer.

12. The material as claimed in claim 11, wherein the at least one functional layer is the metallic layer and the metallic layer is a silver or niobium layer, or wherein the at least one functional layer is the transparent conductive oxide and the transparent conductive oxide is indium-tin oxide, doped tin oxide or doped zinc oxide.

13. The material as claimed in claim 10, wherein the at least one functional layer is an electrically conductive, solar control, or low-emissivity functional layer.

14. The material as claimed in claim 1, wherein the enamel layer is formed from a composition comprising at least one pigment and at least one zinc borosilicate glass frit.

15. The material as claimed in claim 1, wherein the enamel layer is opaque and covers an entire surface of said one of its faces of the glass sheet, or is placed on a periphery of the glass sheet.

16. The material as claimed in claim 15, wherein the enamel layer is black or gray.

17. A glazing comprising at least one material as claimed in claim 1.

18. A door of a household appliance comprising at least one material as claimed in claim 1.

19. A process for manufacturing a material as claimed in claim 1, comprising depositing a stack of layers on at least part of one face of a glass sheet, and then depositing on at least part of the surface of said stack of an enamel layer comprising zinc and less than 5% by weight of bismuth oxide.

20. The process as claimed in claim 19, wherein at least part of the stack of layers is deposited by sputtering.

21. The process as claimed in claim 19, wherein the deposition of the enamel layer comprises a firing step at a temperature of at least 600° C.

* * * * *